Patented Oct. 15, 1940

2,218,030

UNITED STATES PATENT OFFICE 2,218,030

DIPHENYLSULPHONE-4,4'-DI - ISOCYANATE AND PROCESS OF MAKING IT

Paul Pöhls and Fritz Mietzsch, Wuppertal-Elberfeld, Germany, assignors to Winthrop Chemical Company, Inc., New York, N. Y., a corporation of New York No Drawing. Application May 17, 1939, Serial No. 274,229. In Germany May 20, 1938

2 Claims. (Cl. 260—453)

This invention relates to diphenylsulphone-4,4'-di-isocyanate.

In accordance with the present invention diphenylsulphone-4,4'-di-isocyanate which has proved as a valuable product for the manufacture of therapeutically active compounds (compare copending application for Letters Patent Serial No. 274,228 filed May 17, 1939) can be obtained by reacting upon 4,4'-diaminodiphenylsulphone-dihydrochloride after suspension in ortho-dichlorobenzene with phosgene at increased temperature, preferably while boiling the reaction mixture. The diphenylsulphone-4,4'-di-isocyanate thus obtainable melts at 149° C.

The invention is further illustrated by the following example, but is not limited thereto:

480 grams of 4,4'-diamino-diphenylsulphone-dihydrochloride are suspended in 3000 ccs. of ortho-dichlorobenzene. Phosgene is introduced into the suspension at 180° C. while stirring until the dihydrochloride has completely dissolved. The solution is filtered to remove some impurities and the filtrate concentrated to a small volume. The diphenylsulphone-4,4'-di-isocyanate melting at 149° C. crystallizes from the concentrated solution after cooling.

We claim:

1. The process which comprises introducing phosgene into a suspension of 4,4'-diamino-diphenylsulphone - dihydrochloride in ortho - dichlorobenzene until the 4,4'-diamino-diphenylsulphone-dihydrochloride has completely dissolved while heating the mixture to about 180° C.

2. Diphenylsulphone-4,4'-di-isocyanate.

PAUL PÖHLS.
FRITZ MIETZSCH.